2 Sheets—Sheet 1.

A. O. CAMPBELL.
WIND-MILL.

No. 169,890. Patented Nov. 16, 1875.

Witnesses
William W. Osborn
Edward B. Osborn

Inventor
Albert O. Campbell
By C. W. M. Smith
Attorney

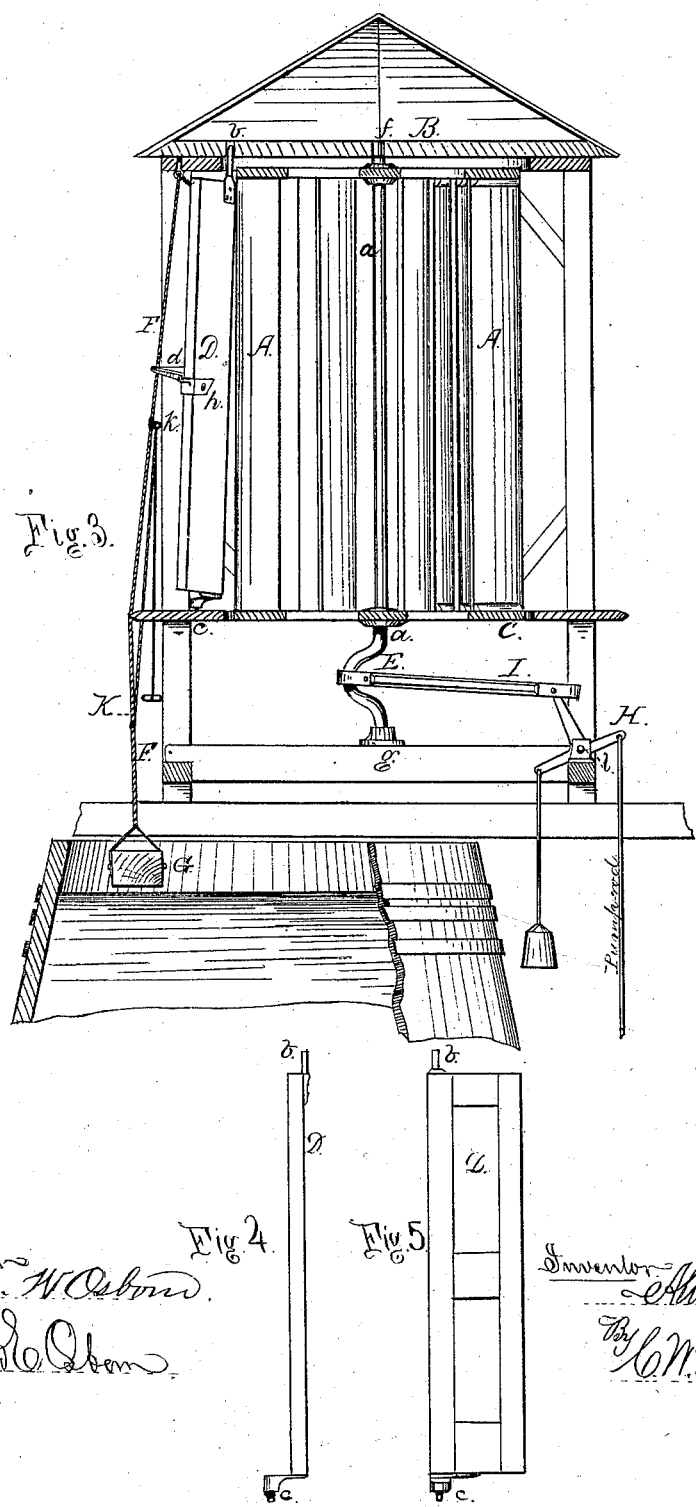

UNITED STATES PATENT OFFICE.

ALBERT O. CAMPBELL, OF OAKLAND, CALIFORNIA.

IMPROVEMENT IN WINDMILLS.

Specification forming part of Letters Patent No. 169,890, dated November 16, 1875; application filed July 21, 1875.

*To all whom it may concern:*

Be it known that I, ALBERT O. CAMPBELL, of Oakland, Alameda county, State of California, have invented an Improvement in Windmills, of which the following is a specification:

My invention relates to that class of windmills in which the wind-wheel is mounted on a vertical shaft, and is surrounded by shutters so arranged as to open and close around the wheel, and thus govern the admission of the wind to the buckets and regulate the action of the mill.

The invention consists, first, in the combination of a series of shutters arranged around the wind-wheel and mounted in such a position as to close together by their own weight, and a float for opening said shutters; second, in the combination of a series of shutters hung upon pivots out of a vertical line, and connected together by cords or wires and angle-irons, and a float for opening simultaneously said shutters by its own weight; and, third, in the combination of a series of shutters adapted to close together by their own weight, a float for opening said shutters, and a stop for limiting their motion, all as more fully hereinafter explained.

The wind-wheel, that gives motion to the driving mechanism of the mill, is hung upon a vertical shaft and has a series of wings or buckets set at a proper angle to cause the wind to impinge against them. Its shaft is held in bearings between an upper and a lower horizontal platform, and between these two are hung the shutters that close around the wheel. These shutters are arranged in a circle around the bucket-wheel, and are hung upon pivots or hinges out of a vertical line, so that they will tend to fall together, and close one upon the other around the wheel. They are connected together by cords, and combined with a weighted float, situated in the water-tank, in such a manner that they are held open by the weight of the float until the water in the tank rises high enough to lift the float and allow the shutters to close of themselves around the wheel and stop the mill.

In order to better understand the construction and operation of my windmill, reference is made to the accompanying drawings, in which—

Figure 1:
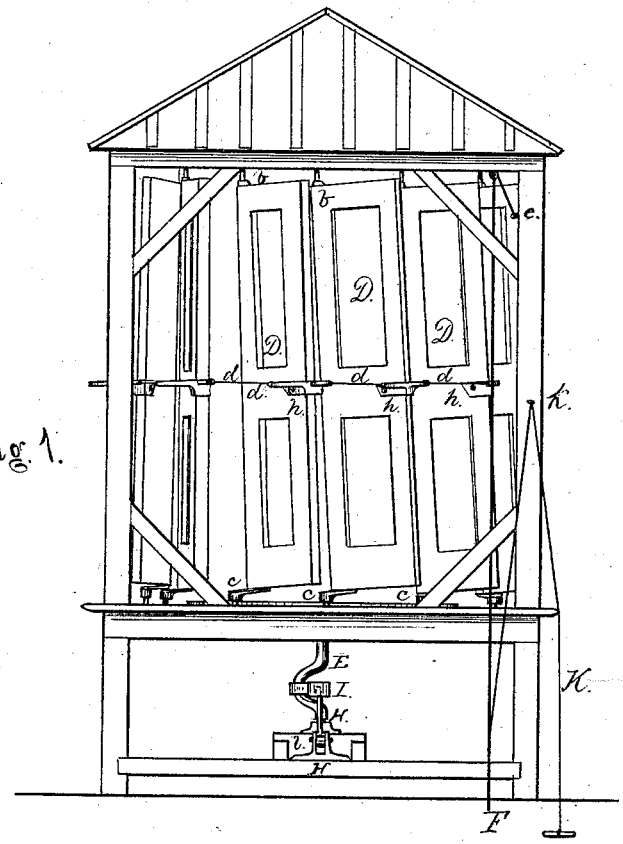
Figure 2:
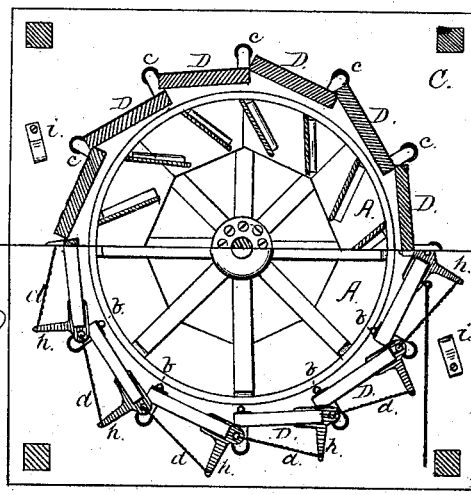

Figure 1 shows an elevation of the mill; Fig. 2, a top view, with the roof or upper platform removed, and with the upper half of the view in section, in a plane taken just above and parallel with the lower platform. Fig. 3 is an elevation in section, and Figs. 4 and 5 views in detail of the construction of the shutters.

A is the wind-wheel, having vertical wings or buckets, and rotating upon the shaft $a$. B C are the two platforms, between which the wheel and its shutters are placed. D D are the shutters, hung upon the pivots or hinges $b\ b\ c\ c$, out of a vertical line, and having a tendency to fall together of their own weight, but held open by the weight of the float G, upon the end of the cord F. The other end of this cord is secured to one of the shutters at $e$, and, as they are all connected together by means of the wires $d\ d$ and the angle-irons $h\ h$, the weight of the float acts upon them all to hold them open. The shaft $a$ turns in bearings $f\ g$, and is made with a crank, E, at or near its lower end, which is connected to the walking-beam H by the pitman I. It gives motion through these parts to the pumps that supply the tanks. The walking-beam H is formed of a three-armed lever, to which the pitman I and the pump-rods are connected, as before described, and it is made of this form to allow two pumps to be worked by the mill, or, when one pump is used, to permit a counter-balance to be employed for the purpose of equalizing the weight of the pump-rod and piston, and of taking the strain from the crank and the shaft $a$. The shutters D D are arranged in a circle about the wind-wheel A, between the two platforms, and they open and close upon the pivots $b\ c$, that serve as hinges. These are placed at the upper and lower corners of one side of the shutter, and the lower pivot, $b$, is placed outside of the line of the upper one, $c$, and farther from the axis of the circle, as shown in Figs. 2, 4, and 5, so that when the shutters are open they take an inclined position out of a vertical line, and therefore their tendency is to fall together and close one upon the other around the wind-wheel. Each shutter has an angle-iron, $h$, secured to it, formed of a long and a short arm, and the iron of one shutter is connected with that of the other by the cords or wires $d\ d$, one end of the cord being attached to the long arm of one shutter, and to the short arm of the next one forward, so that any movement of one shutter causes the others to move simultaneously with it. The position of the shutters, when open, is regulated by the stops $i\ i$, that serve to keep them at the proper angle, and prevent them from being thrown too far outward. They are drawn open by the weight of the float G, and held by it to allow the wind to enter between them and act upon the buckets of the wind-wheel, and they are so held until the level of the water in the tank reaches the float G and lifts it, when, the weight being removed from the cord F, the shutters will fall together of themselves and close around the wind-wheel. This action of the shutters to stop the operation of the mill will take place as often as the tank becomes full of water, as the float H is arranged within the tank to allow it to be raised by the water every time its level reaches a certain height, and when the water is drawn from the tank sufficiently to permit the float to act upon the cord F the shutters will be opened and the wind allowed to have access to the wind-wheel and start the mill. The mill is thus put in motion every time the water becomes low in the tank, and is stopped whenever the tank is full, and in this manner the mill is made automatic, and its action is made to conform to the amount of water in the tank, so that no more water shall be raised by the pumps than can be contained in the tank, and no useless working of the mill and pumps is allowed.

The use of the three-armed lever H, to work the pump, permits two pump-rods to be operated from the one shaft $a$ without the employment of additional mechanism, and the weight of one rod and its valves being balanced by the weight of the rod at the end of the other arm, the mill is caused to work with less strain upon the shaft and its connections; and this form of the walking-beam also allows a counter-balance weight to be used where but one pump is worked.

The mill may be also stopped in its motion at any time when desired, independent of the action of the float G, by having a cord, K, attached to the float and running up over a pulley, $k$, on the side of the mill-frame. By means of this cord the float G may be raised at any time, and its weight taken from the cord F, and the shutters allowed to fall together.

Having thus fully described my invention, what I claim as new, and desire to secure by Letters Patent, is—

1. In a windmill, having its wind-wheel mounted on a vertical axis, the combination of a series of shutters arranged around said wind-wheel, and mounted in such a position as to close together by their own weight, and a float for opening the said shutters, substantially as described and shown.

2. In a windmill, having its wind-wheel mounted on a vertical axis, the combination of a series of shutters hung upon pivots $b\ c$, out of a vertical line, as described, and connected together by cords or wires $d$ and the angle-irons $h$, and a float for simultaneously opening the said shutters by its weight, substantially as described and shown.

3. In a windmill, having its wind-wheel mounted on a vertical axis, the combination of a series of shutters, D, adapted to close together by their own weight, a float for opening the said shutters, and a stop for limiting their motion, substantially as described and shown.

In witness whereof I have hereunto set my hand and seal.

ALBERT O. CAMPBELL. [L. S.]

Witnesses:
 C. W. M. SMITH,
 EDWARD E. OSBORN.